United States Patent
Israel et al.

(10) Patent No.: US 10,481,334 B2
(45) Date of Patent: Nov. 19, 2019

(54) FIBER TO CHIP OPTICAL COUPLER

(71) Applicant: Teramount Ltd., Jerusalem (IL)

(72) Inventors: Abraham Israel, Jerusalem (IL); Hesham Taha, Jerusalem (IL)

(73) Assignee: TERAMOUNT LTD., Jerusalem (IL)

(*) Notice: Subject to any disclaimer, the term of this patent is extended or adjusted under 35 U.S.C. 154(b) by 0 days.

(21) Appl. No.: 15/797,792

(22) Filed: Oct. 30, 2017

(65) Prior Publication Data

US 2018/0045891 A1 Feb. 15, 2018

Related U.S. Application Data

(63) Continuation of application No. 14/878,591, filed on Oct. 8, 2015, now Pat. No. 9,804,334.

(51) Int. Cl.
*G02B 6/30* (2006.01)
*G02B 6/26* (2006.01)
*G02B 6/36* (2006.01)
*G02B 6/42* (2006.01)

(52) U.S. Cl.
CPC .......... *G02B 6/30* (2013.01); *G02B 6/262* (2013.01); *G02B 6/3692* (2013.01); *G02B 6/4214* (2013.01); *G02B 6/4243* (2013.01); *G02B 6/4246* (2013.01); *G02B 6/4259* (2013.01)

(58) Field of Classification Search
None
See application file for complete search history.

(56) References Cited

U.S. PATENT DOCUMENTS

| | | | |
|---|---|---|---|
| 4,744,618 A | 5/1988 | Mahlein | |
| 5,913,002 A | 6/1999 | Jiang | |
| 5,939,782 A | 8/1999 | Malladi | |
| 6,122,417 A | 9/2000 | Jayaraman et al. | |
| 6,198,864 B1 | 3/2001 | Lemoff et al. | |
| 6,271,970 B1 | 8/2001 | Wade | |
| 6,600,845 B1* | 7/2003 | Feldman | G02B 6/4204 385/14 |
| 6,832,031 B2 | 12/2004 | Smaglinski | |

(Continued)

FOREIGN PATENT DOCUMENTS

RU 2438209 C1 12/2011
RU 2485688 C2 6/2013

(Continued)

OTHER PUBLICATIONS

O'Brien, "Silicon Photonics Fiber Packaging Technology", Photonics Packaging Group, Tyndall National Institute, Cork, Ireland, Sep. 2012.

(Continued)

*Primary Examiner* — Tina M Wong
(74) *Attorney, Agent, or Firm* — M&B IP Analysts, LLC.

(57) ABSTRACT

An optical connector for optical coupling a plurality of optical fibers to a photonic integrated circuit (PIC) comprises a plurality of fiber trenches; a plurality of tiled flat mirrors; and a plurality of optical focusing elements; wherein each of the plurality of fiber trenches adjoins a corresponding titled flat mirror of the plurality of titled flat mirrors; and wherein each of the plurality of titled flat mirrors is placed in proximity to a corresponding optical focusing element of the plurality of optical focusing elements.

11 Claims, 8 Drawing Sheets

(56) References Cited

U.S. PATENT DOCUMENTS

| | | | |
|---|---|---|---|
| 6,862,092 B1* | 3/2005 | Ibsen | G01J 3/00 |
| | | | 356/328 |
| 6,888,988 B2* | 5/2005 | Vancoille | G02B 6/4214 |
| | | | 385/3 |
| 6,941,047 B2* | 9/2005 | Capewell | G02B 6/29367 |
| | | | 385/33 |
| 7,050,304 B2 | 5/2006 | Hsu et al. | |
| 7,058,275 B2 | 6/2006 | Sezerman et al. | |
| 7,139,448 B2 | 11/2006 | Jain et al. | |
| 7,260,328 B2 | 8/2007 | Kropp | |
| 7,288,756 B2 | 10/2007 | Sheffer et al. | |
| 7,317,746 B2 | 1/2008 | Ericson et al. | |
| 7,447,404 B2 | 11/2008 | Miller | |
| 7,853,101 B2 | 12/2010 | Carothers | |
| 7,970,041 B2 | 6/2011 | Arimoto et al. | |
| 8,000,565 B2 | 8/2011 | Liu | |
| 8,117,982 B2 | 2/2012 | Gruber et al. | |
| 8,390,806 B1 | 3/2013 | Subramanian | |
| 8,471,467 B2 | 6/2013 | Boerner | |
| 8,582,934 B2 | 11/2013 | Adler et al. | |
| 8,834,146 B2 | 9/2014 | Saha et al. | |
| 8,836,942 B2 | 9/2014 | Quan et al. | |
| 8,929,693 B2 | 1/2015 | Shin et al. | |
| 9,099,581 B2 | 8/2015 | Na et al. | |
| 9,429,725 B2* | 8/2016 | Shao | H04B 10/40 |
| 9,496,248 B2 | 11/2016 | Lee et al. | |
| 2002/0118907 A1* | 8/2002 | Sugama | G02B 6/12002 |
| | | | 385/14 |
| 2002/0131180 A1 | 9/2002 | Goodman | |
| 2002/0164129 A1 | 11/2002 | Jackson | |
| 2003/0002809 A1* | 1/2003 | Jian | G02B 6/423 |
| | | | 385/73 |
| 2003/0043157 A1 | 3/2003 | Miles | |
| 2003/0142896 A1 | 7/2003 | Kikuchi et al. | |
| 2004/0184704 A1 | 9/2004 | Bakir et al. | |
| 2005/0025430 A1 | 2/2005 | Bhagavatula et al. | |
| 2005/0276613 A1 | 12/2005 | Welch et al. | |
| 2009/0178096 A1 | 7/2009 | Menn et al. | |
| 2009/0262346 A1* | 10/2009 | Egloff | G01J 3/02 |
| | | | 356/326 |
| 2010/0002987 A1 | 1/2010 | Hata et al. | |
| 2011/0091167 A1 | 4/2011 | Nishimura | |
| 2011/0280573 A1 | 11/2011 | Collings et al. | |
| 2011/0293281 A1 | 12/2011 | Sakurai | |
| 2012/0002284 A1* | 1/2012 | McColloch | G02B 6/4206 |
| | | | 359/558 |
| 2012/0063721 A1* | 3/2012 | Chen | H04B 10/564 |
| | | | 385/33 |
| 2013/0044977 A1 | 2/2013 | Amit | |
| 2013/0109083 A1 | 5/2013 | Llobera | |
| 2013/0129281 A1 | 5/2013 | Son et al. | |
| 2014/0023098 A1 | 1/2014 | Clarkson et al. | |
| 2014/0064559 A1 | 3/2014 | Sugasawa et al. | |
| 2014/0226988 A1 | 8/2014 | Shao et al. | |
| 2014/0363165 A1 | 12/2014 | Panotopoulos et al. | |
| 2015/0050019 A1* | 2/2015 | Sengupta | H04J 14/04 |
| | | | 398/44 |
| 2015/0124336 A1* | 5/2015 | Kaufman | G01J 3/0205 |
| | | | 359/728 |
| 2016/0161686 A1 | 6/2016 | Li et al. | |
| 2016/0195677 A1* | 7/2016 | Panotopoulos | G02B 6/4214 |
| | | | 250/227.23 |

FOREIGN PATENT DOCUMENTS

| | | |
|---|---|---|
| RU | 2577669 C2 | 3/2016 |
| WO | 2001067497 A1 | 9/2001 |

OTHER PUBLICATIONS

Barwicz, et al., "Assembly of Mechanically Compliant Interfaces Between Optical Fibers and Nanophotonic Chips", IEEE 64th Electronics Components and Technology Conference, Orlando, Fl., May 27-30, 2014.

Bogaerts, "Helios Lecture: Coupling Light To Silicon Photonic Circuits", Silicon Photonics—PhD Course prepared within FP7-224312 Helios Project, Ghent University-IMECGhent, Belgium, Nov. 2009.

Chiral Photonics., "Fiber Coupler Overview", Pinebrook, NJ, Jan. 2013.

Cunningham, et al., "Aligning Chips Face-to-Face for Dense Capacitive and Optical Communication", IEEE Transactions on Advanced Packaging, vol. 33, No. 2, May 2010.

Foreign Office Action and Search Report for ROC (Taiwan) Patent Application No. 105121625 dated Sep. 5, 2017 from IPO (Intellectual Property Office) of Taiwan.

Hou, et al., "Physics of Elliptical Reflectors at Large Reflection and Divergence Angles I: Their Design for Nano-Photonic Integrated Circuits and Application to Low-loss Low-crosstalk Waveguide Crossing", Northwestern University, Evanston, IL., Apr. 2012.

Kopp, et al., "Silicon Photonic Circuits: On-CMOS Integration, Fiber Optical Coupling, and Packaging", IEEE Journal of Selected Topics in Quantum Electronics, Aug. 2010.

Nguyen, et al., "Silicon-based Highly-efficient Fiber-to-waveguide Coupler for High Index Contrast Systems", Applied Physics Letters, American Institute of Physics, downloaded Feb. 29, 2012, published online Feb. 24, 2006.

PCL Connections LLC, all rights reserved, "In-Line Coupling Element (ICE) for Bonded Grating Coupling to Silicon PICs", Columbus, OH., May 2013.

The International Search Report and The Written Opinion for PCT/US2016/038047, ISA/RU, Moscow, Russia, dated Oct. 13, 2016.

Zimmerman, "State of the Art and Trends in Silicon Photonics Packaging", Silicon Photonics Workshop, Technische Universitat Berlin, May 2011.

The European Search Report for EP Application No. 16854021.9 dated Aug. 21, 2018, EPO, The Hague.

CAMAPA, CD-ROM, pp. 58, 59, 79, Russia, 2012.

The International Search Report and The Written Opinion for PCT/US2017/055146, ISA/RU, Moscow, Russia, dated Jan. 31, 2018.

Notice of Deficiencies for EP Application No. 16854021.9 dated Jun. 24, 2019, EPO, Rijswijk, Netherlands.

The First Chinese Office Action for Chinese Patent Application No. 2016800557192, dated Aug. 22, 2019, China, CNIPA.

\* cited by examiner

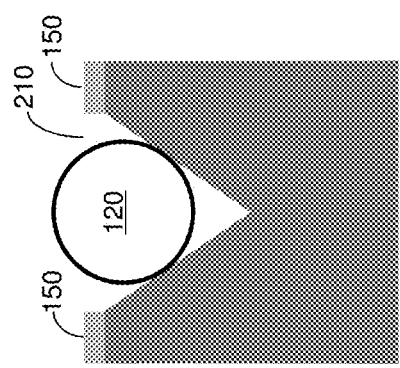

FIBER TO CHIP OPTICAL COUPLER

CROSS REFERENCE TO RELATED APPLICATIONS

This application is a continuation of U.S. patent application Ser. No. 14/878,591 filed on Oct. 8, 2015, now allowed. The contents of the above-referenced Applications are hereby incorporated by reference.

TECHNICAL FIELD

The present disclosure relates generally to coupling an optical fiber to a substrate, and more particularly to coupling the optical fiber to an optoelectronic integrated circuit (IC).

BACKGROUND

Communications systems and datacenters are required to handle massive data at ever increasing speeds and ever decreasing costs. To meet these demands, optical fibers and optical ICs (such as, a photonic integrated circuit (PIC) or integrated optical circuit) are used together with high speed electronic ICs. A PIC is a device that integrates multiple photonic functions (similar to an electronic IC or RF IC). PICs are typically fabricated using indium phosphide or silicon oxide ($SiO_2$), which allows for the integration of various optically active and passive functions on the same circuit.

The coupling of PICs to optical fibers is not as well advanced as the integration and/or coupling of electronic ICs. Specifically, the challenges facing optical connections are different and much more complex than connecting electronic ICs to, for example, a printed circuit board (PCB). Some difficulties are inherent in wavelength, signal losses, assembly tolerance, and polarization characteristics of optical packaging.

Existing solutions utilize various techniques for connecting optical fibers to PICs. One technique suggests using various types of butt connections to the edge and surface fiber connections a PIC. The butt of a fiber can be connected to a planar waveguide at the edge of a PIC. This technique is efficient only if the cross sectional of the propagating mode of the fiber and the waveguide areas of the fiber core and the waveguide are of similar size. In most cases, this technique suffers from poor assembly tolerance.

An improved technique suggests laying a section of fiber on top of the surface of the PIC where the end of the fiber has been cut at an angle to form an angled tip. The angled tip has a flat surface which reflects a light beam down to a waveguide grating coupler disposed on the integrated circuit. The light beam is reflected off the reflective surface of the angled tip by total internal reflection. The waveguide grating coupler is designed to accept the slightly diverging light beam from the reflective surface of the angled tip of the fiber. The light beam can also propagate through the fiber to a chip coupler in the opposite direction, up from the substrate through the waveguide grating and into an optical fiber after bouncing off the reflective surface of the angled tip. This technique further requires coating on the exterior of the reflective surface with epoxy.

Among others, all of the above-noted techniques require precise alignment and active positioning of the optical fiber to the PIC. As such, current techniques suffer from poor and very tight alignment tolerance to gain an efficient connectivity. For example, a misalignment between an optical fiber and a PIC of 1-2 microns (μm) would result in a signal loss of about 3 db. Furthermore, the alignment is now performed with expensive equipment or labor-intensive assembly solutions. As a result, a mass production of PICs and/or optical couplers is not feasible.

It would therefore be advantageous to provide a fiber-to-chip optical coupling solution that would overcome the deficiencies of the existing solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosure relates in various embodiments to an optical coupler for coupling an optical fiber to a photonic integrated circuit (PIC). The optical coupler comprises a first curved mirror included in a first substrate layer of the PIC and at a first predefined lateral distance from an optical transceiver associated with the PIC; a second curved mirror included in a second substrate layer and placed at a second predefined lateral distance from the optical fiber; and a spacer located between the first substrate layer and the second substrate layer.

The disclosure also relates in various embodiments to a photonic plug comprising a plurality of optical couplers enabling optical connectivity between a plurality of optical fibers and a photonic integrated circuit (PIC) dispose on a first substrate layer, wherein each of the plurality of optical couplers include a second substrate layer, at least one optical focusing element, a tilted flat mirror, a fiber trench etched in the second substrate layer, and a spacer located between the first substrate layer and the second substrate layer.

The disclosure also relates in various embodiments to a method for manufacturing an optical coupler for coupling an optical fiber to a photonic integrated circuit (PIC). The method comprises: fabricating, in a first substrate layer, a first curved mirror, wherein the first substrate layer is part of the PIC; fabricating, in a second substrate layer, a second curved mirror; and disposing a spacer between the first substrate layer and the second substrate layer.

The disclosure also relates in various embodiments to a photonic integrated circuit (PIC) package comprising a first substrate layer including at least a first curved mirror; a second substrate layer including at least a second curved mirror; and a spacing layer coupling between the first substrate layer and the second substrate layer.

The disclosure also relates in various embodiments to an optical connector for optical coupling a plurality of optical fibers to a photonic integrated circuit (PIC), comprising: a plurality of fiber trenches; a plurality of tiled flat mirrors; and a plurality of optical focusing elements; wherein each of the plurality of fiber trenches adjoins a corresponding tilted flat mirror of the plurality of tilted flat mirrors; and wherein each of the plurality of titled flat mirrors is placed in proximity to a corresponding optical focusing element of the plurality of optical focusing elements.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 3A through 3D illustrate a fiber trench according to one embodiment.

DETAILED DESCRIPTION

Figure 1:
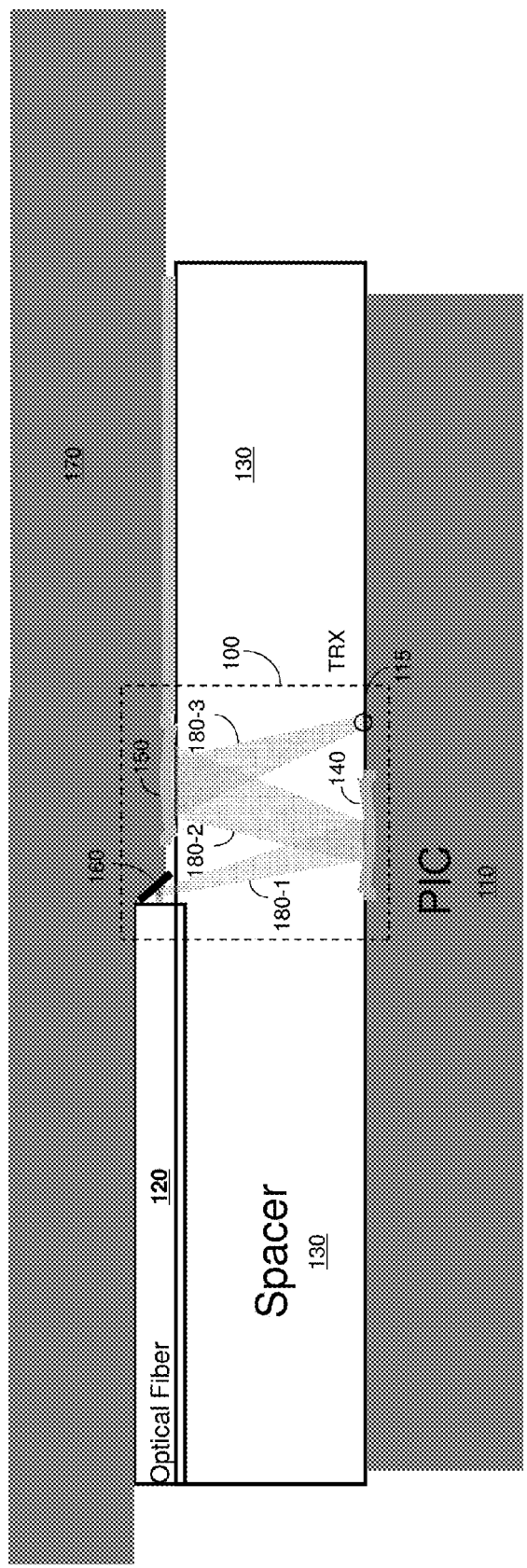
FIG. 1 is a side view of a fiber-to-chip optical coupler constructed according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the various disclosed embodiments, an adaptive optical coupling solution that provides efficient and scalable fiber-to-chip and chip-to-fiber optical connections is presented. The chip includes, but is not limited to, a photonic integrated circuit (PIC). The fiber in the "fiber-to-chip and chip-to-fiber optical" connections can be an optical fiber, a laser, or any type of light source and/or light drain. The scalability of the disclosed optical coupler or (a photonic plug) is achieved due to its optical arrangement that provides high tolerance alignment and a passive positioning of the optical coupler, thus the optical fiber with respect to the PIC. Therefore, the disclosed optical coupler can be mass-produced. In certain embodiments, the disclosed optical coupler allows for compact and secured packaging of PICs. In a further embodiment, the disclosed optical coupler solution provides integrality with flip-chip arrangement. The various disclosed embodiments are discussed in detail below.

FIG. 1 is a side view of a fiber-to-chip optical coupler 100 constructed according to one embodiment. The optical coupler 100 provides an optical connection between a PIC 110 and an optical fiber 120. In an embodiment, the optical coupler 100 includes a spacer 130 connected between the PIC 110 and the optical fiber 120, a first curved mirror 140, a second curved mirror 150, and a tilted flat mirror 160. The optical coupler 100 may also include a fiber trench (not shown in FIG. 1).

The optical fiber 120 and the coupler 100 are stacked under a substrate layer 170. Specifically, as will be discussed below, the second curved mirror 150 and the tilted flat mirror 160 are fabricated in the substrate 170. The substrate 170 may be the same or a different type as of the substrate of the PIC 110. In an exemplary embodiment, the substrate layer 170 may be made of silicon oxide ($SiO_2$), plastic, and the like. In another embodiment, the second curved mirror 150 and the tilted flat mirror 160 are fabricated (and included) in the spacer 130 and not the substrate 170.

According to one embodiment, the material of the spacer 130 may be any transparent and non-conductive material, such as glass, polydimethylsiloxane, air, or any other index matching materials. The height of the spacer 130 determines, in part, the efficiency of the light beam (optical signal) that propagates through the spacer 130. Specifically, the higher the spacer 130 is, the more the coupler 100 is error-prone to rotation and leveling errors between the PIC 110 and the coupler 100. In an exemplary and non-limiting embodiment, the height of the spacer 130 is set to 300 μm.

The tilted flat mirror 160 is utilized to direct a light beam from the optical fiber 120 to the first curved mirror 140 and/or from the first curved mirror 140 to the optical fiber 120. This allows for placement of the optical fiber 120 parallel to the PIC 110. The tilted flat mirror 160 is formed by means of anisotropic grayscale etching and tilted at a predefined angle. The angle is determined respective of the optical path between the optical fiber 120 and the first curved mirror 140. In certain implementations, the tilted flat mirror 160 is optional. As a non-limiting example, when the optical fiber 110-is replaced with a laser, then the light can be easily directed to the second curved mirror 150, thus the flat mirror 160 is not required in such an arrangement.

As illustrated, the first and second curved mirrors 140 and 150 are collimated mirrors placed at opposite directions to each other. Specifically, the first curved mirror 140 is placed at the "PIC side" while the second curved mirror 150 is placed at the "fiber side". This arrangement allows for separation of the optical fiber 120 from the PIC 110, thereby gaining high and relaxed alignment tolerances (at three-dimensions). In an embodiment, the positioning and creation of the first and second curved mirrors 140 and 150 is performed on the substrate of the PIC 110 and on the substrate layer 170 using a similar photolithography process such as, but not limited to, grayscale lithography. In an embodiment, the placement on the tilted flat mirror 160, the curved mirror 150, and the fiber trenches are placed using the same lithography mask alignment accuracy. In another embodiment, the placement on the tilted flat mirror 160 and the curved mirror 150 are placed using a first lithography mask alignment accuracy, and the fiber trenches are placed using a second lithography mask alignment accuracy.

Further, the first and second curved mirrors 140 and 150 are placed and created during fabrication, which ensures high accuracy positioning and accurate reflective mirrors. As a non-limiting example, the fabrication process utilized to create the mirrors may include a Silicon-On-Insulator (SOI), complementary metal-oxide semiconductor (CMOS), and the like.

The first and second curved mirrors 140 and 150 are fabricated by two different processes and optionally at two different fabrication facilities (fabs), but using the same or substantially similar grayscale lithography process. This ensures high accuracy of the mirrors and their assembly to create the optical coupler. Furthermore, by fabricating and placing the first and second curved mirrors 140 and 150 on the substrates, the optical fiber 120 is separated from the PIC 110, thereby allowing relaxed alignment tolerances in 3-dimenstions. That is, even if the "fiber side" of the optical coupler 100 is not perfectly aligned with the PIC 110, the optical signal is not significantly attenuated.

The disclosed arrangement of the optical coupler 100 achieves high signal efficiency with a relaxed alignment between the PIC 110 and the light beam source and/or drain due to the specific locations and shape of the first and second curved mirrors 140 and 150 placed against each other. The locations of the first and second curved mirrors 140 and 150 are determined at least with respect to the source/drain light beam. This allows the light beam to be reflected from the first and second curved mirrors 140 and 150. Specifically, the first and second curved mirrors 140 and 150 are shaped in such a way that all light beams from the source are reflected and collimated at a certain angle at a center of the first curved mirror 140 and focused to a drain after the second curved mirror 150. The design of the first and second curved mirrors 140 and 150 is described in further detail with respect to FIG. 5.

For example, as illustrated in FIG. 1, the first curved mirror 140 reflects a diverging light beam 180-1 from the optical fiber 120 (via the tilted flat mirror 160) into parallel light beams 180-2. The light beams 180-2 reach the second curved mirror 150 which reflects a focused light beam 180-3 back to the PIC's 110 transceiver -115. The same optical path is true for a light beam transmitted by the transceiver -115. The embodiment for designing the coupler 100 is discussed with reference to FIG. 6. It should be noted that all light beams 180 travel to the spacer 130.

It should be noted the optical coupler 100 discussed with referenced to FIG. 1 allows a connection between a single fiber and the PIC 110. However, in a typical arrangement, a plurality of couplers 100 can be utilized to connect a plurality of optical fiber to the PIC 110.

Figure 2:
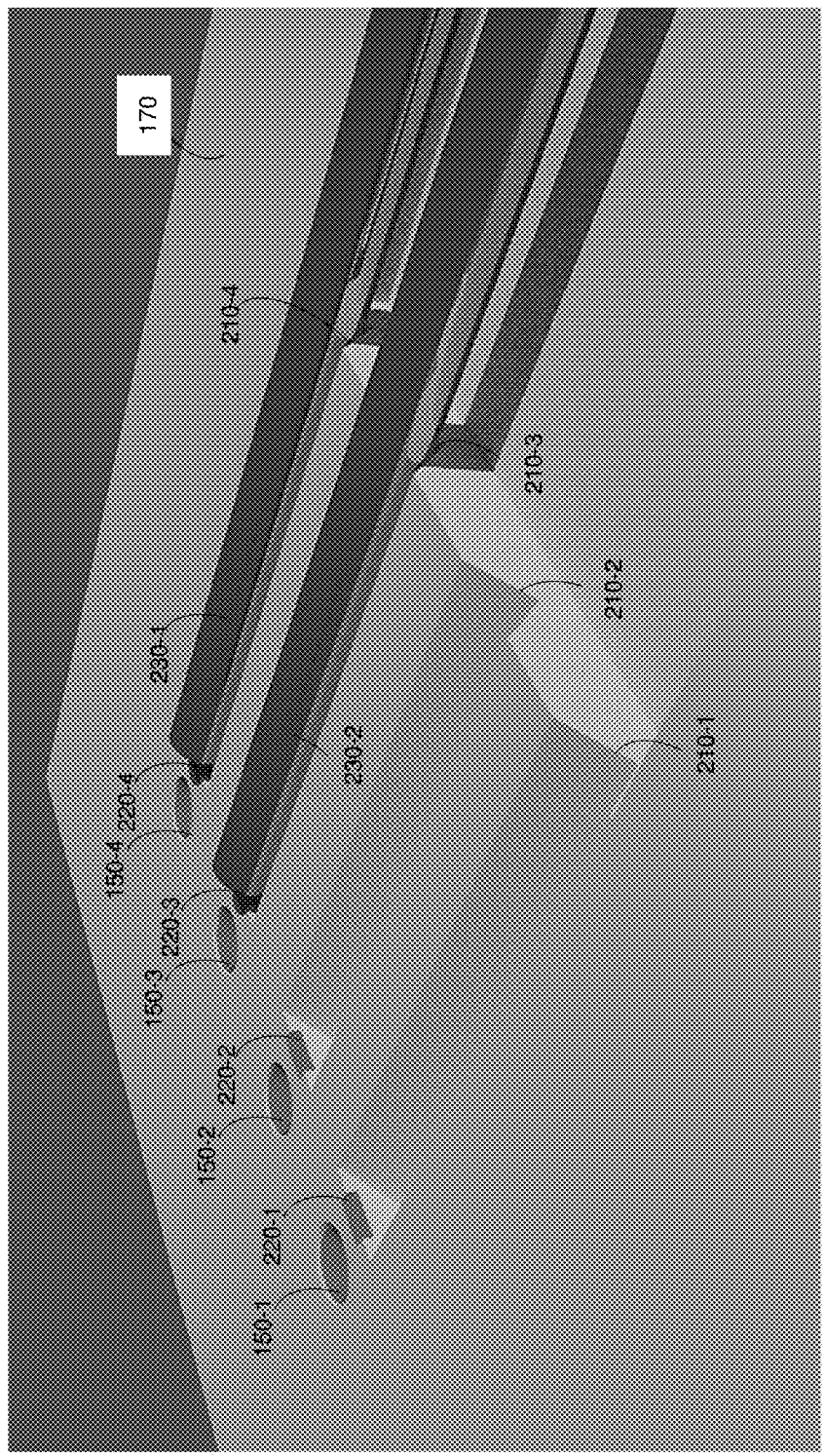
FIG. 2 is a top view of the "fiber side" of the disclosed arrangement according to one embodiment.

As noted above, the optical fiber 120 is attached to the coupler 100 using a fiber trench. This arrangement is further illustrated in FIG. 2 which shows an exemplary and non-limiting top view of the "fiber side" of the disclosed arrangement. FIG. 2 illustrates four (4) fiber trenches 210-1 through 210-4 (hereinafter referred to individually as a fiber trench 210 and collectively as fiber trenches 210, merely for simplicity purposes). Each fiber trench 210 adjoins a tilted flat mirror 220. The fiber trench 210 is shaped as a groove etched in the substrate layer 170. Each of the tilted flat mirrors 220-1 through 220-4 is oriented as the tilted flat mirror (160) shown in FIG. 1. As demonstrated in FIG. 2, optical fibers 230-1 and 230-2 are placed in the fiber trenches 210-3 and 210-4, respectively.

Also illustrated in FIG. 2, are four curved mirrors 150-1 through 150-4. Each of the curved mirrors 150 is oriented as the second curved mirror (150) shown in FIG. 1. It should be noted that only 2 optical fibers 230-1 and 230-2 are shown in FIG. 2 merely for illustrative purposes. Other numbers of optical fibers may be utilized without departing from the scope of the disclosed embodiments. The exemplary arrangement shown in FIG. 2 can support coupling of four optical fibers to a PIC (not shown). It should be noted that the number of optical fibers that can be supported can be greater than four. It should be further noted that the fiber trenches illustrated in FIG. 2 are shaped as V-grooves, however, any type of groove shape can be utilized, such as square, cylinder, diamond, and the like.

Figure 3A:
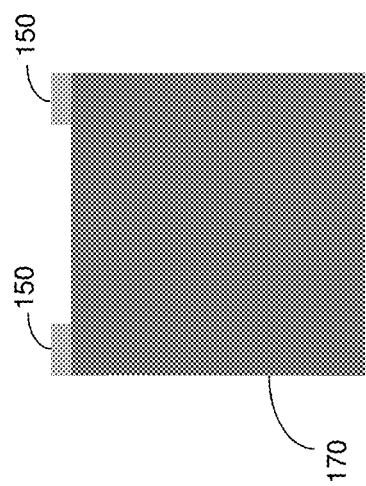
Figure 3B:
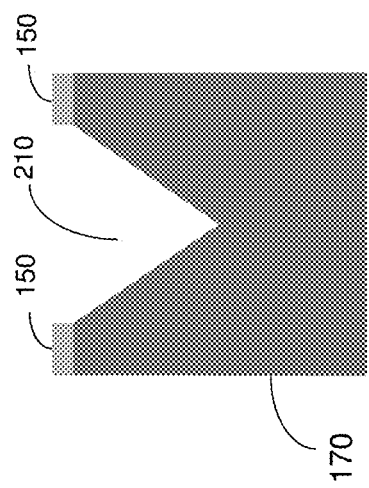
Figure 3D:
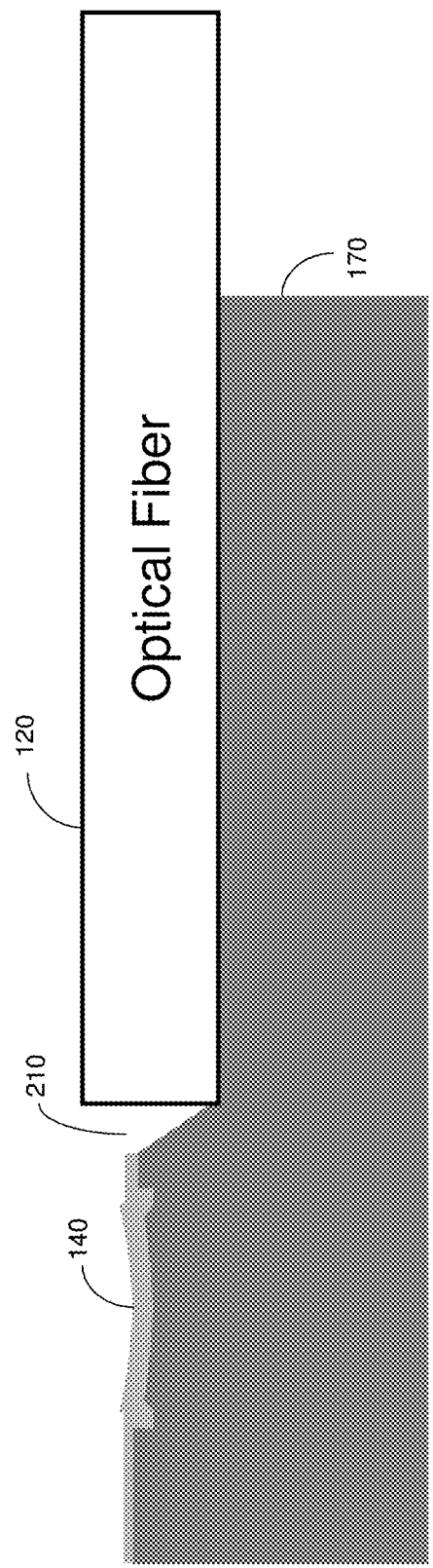

The process for creating a fiber trench 210 is further described with reference to FIGS. 3A through 3D. FIG. 3A is a side view of the substrate layer 170. At first, only the curved mirror 150 is placed on the substrate layer 170. Then, as shown in FIG. 3B, a groove is etched in the substrate layer 170 to create the fiber trench 210. Finally, an optical fiber 120 is placed in the fiber trench 210 (FIG. 3C). FIG. 3D shows a side view of the substrate layer 170 with the attached optical fiber 120. It should be noted that the arrangement shown in FIG. 3D is flipped relative to the arrangement shown in FIG. 1.

Figure 4:
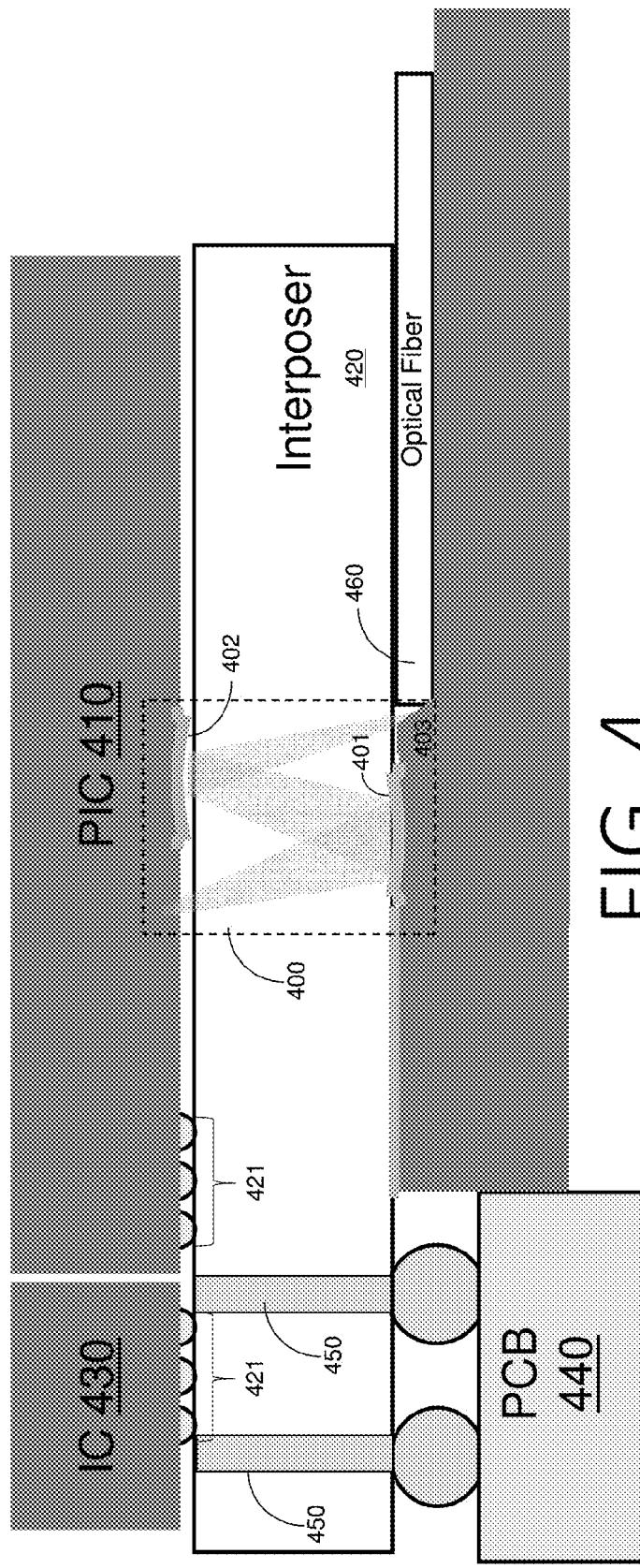
FIG. 4 is a side view of a chip-to-fiber optical coupler utilized as a waveguide arranged according to one embodiment.

FIG. 4 is a side view of a chip-to-fiber optical coupler 400 utilized as a waveguide arranged according to an embodiment. In this embodiment, the PIC 410 is flipped and placed on an interposer 420 which serves as a spacer (similar to, e.g., the spacer 130) of the coupler 400. The interposer 420 is an electrical interface routing from one connection to another in order to spread a connection to a wider pitch or to re-route a connection 421 to a different connection.

Also coupled to the interposer 420 is an integrated circuit (IC) 430 including only electrical elements. The connection between the IC 430 and a PIC circuit board (PCB) 440 is through vias 450. The optical connection between the PIC 410 and the optical fiber 460 is achieved by means of the coupler 400. The coupler 400 is constructed as discussed in greater detail herein above with reference to FIG. 1. That is, the coupler 400 includes a pair of curved mirrors 401 and 402, as well as a tilted flat mirror 403. It should be noted that the single mounting by a standard electronics method (flip-chip on an interposer) provides the PIC 410 with electrical and optical connectivity required for its operation. The interposer 420 is made of a material that is transparent to the wave length of the light beam.

Figure 5:
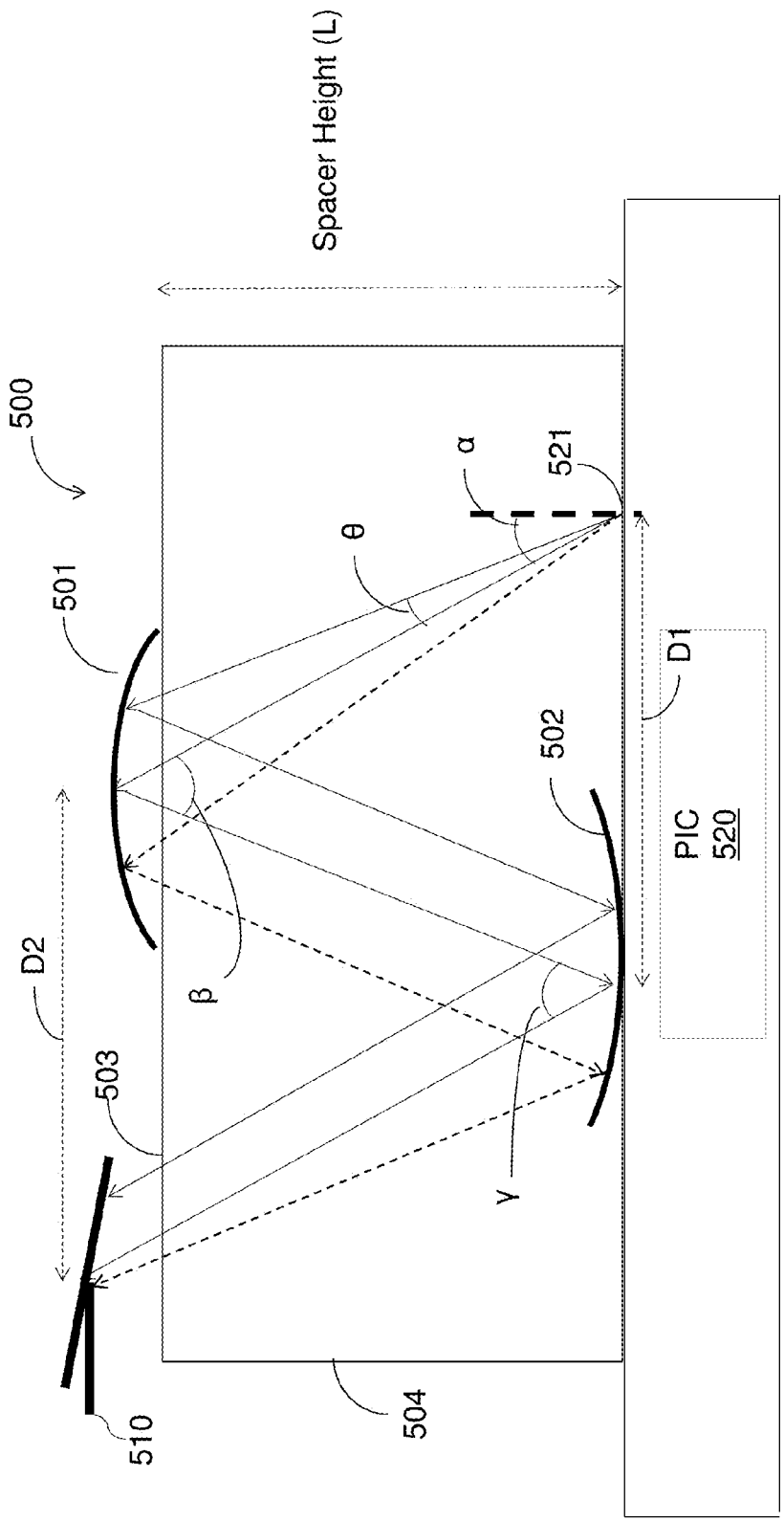
FIG. 5 is a diagram utilized to describe the fiber-to-chip optical coupler according to one embodiment.

FIG. 5 is an exemplary diagram utilized to describe the fiber-to-chip optical coupler 500 according to an embodiment. The optical coupler 500 includes a first curved mirror 501, a second curved mirror 502, a tilted flat mirror 503, and a spacer 504. In this example, a drain 510 is an optical fiber and a transmitter 521 of a PIC 520 is the source of the light beam.

A few adjustable parameters determine the design of the coupler 500: a spacer height, main propagation angles ($\alpha$, $\beta$, $\gamma$), the propagation medium type of the spacer 504, and a target tolerance for misalignment.

The beam's radius is determined by the beam's radius at the source 521, the medium in which the beam propagates, and the wavelength. First, the angle of divergence ($\theta$) is selected as the angle where the intensity of the light beam is 1% of the intensity at the center of the beam. Then, in an exemplary embodiment, the main propagation angles ($\alpha$, $\beta$, $\gamma$) are set to meet the following constraints:

$$\alpha+\beta>\theta$$

$$\alpha=\beta=\gamma$$

Typically, the value of $\theta$ is 8°-12°. It should be noted that other constraints may be set to different target tolerances. As noted above, the spacer height L is set respective of the allowed tolerance for rotation and leveling errors. In an exemplary embodiment, L equals 300 µm.

In an embodiment, the first and second curved mirrors 501 and 502 are designed so that their respective centers are located where the main propagation axis intersects each mirror. Specifically, the mirrors are designed such that the center of the second curved mirror 502 is at a distance $D_1$ from the source 521. In an embodiment, the distance $D_1$ is computed as follows:

$$D_1 = L \times \tan(\alpha) + L \times \tan(\beta);$$

The center of the first curved mirror 501 is at a distance $D_2$ from the drain 510. In an embodiment, the distance $D_2$ is computed as follows:

$$D_2 = L \times \tan(\gamma) + L \times \tan(\beta)$$

Further, the lateral distance, in a 0 μm misalignment, between the first and second curved mirrors 501 and 502 is computed as follows:

$$L \times \tan(\beta)$$

In an embodiment, the first and second curved mirrors 501 and 502 are shaped in such a way that all light beams from the source 521 are reflected and collimated at the angle β after the first curved mirror 501 and focused to the drain 510 after reflecting from the second curved mirror 502. The surfaces of the first and second curved mirrors 501 and 502 are large enough to cover the divergence axis. It should be noted that all calculations are performed as 0 misalignment conditions.

The various optical couplers have been discussed herein with a reference to a specific embodiment with the curved mirrors are utilized for propagating light beams. However, the disclosed embodiments can be realized using other reflective or focusing elements, such as optical lenses, zone plates (e.g., Fresnel zone plates), and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An optical connector for optical coupling a plurality of optical fibers to a photonic integrated circuit (PIC), comprising:
   a plurality of linear fiber trenches;
   a plurality of tilted flat mirrors;
   a plurality of optical focusing elements; and
   a spacer between the optical fibers and PIC;
   wherein each of the plurality of linear fiber trenches adjoins a corresponding tilted flat mirror of the plurality of tilted flat mirrors; and
   wherein each of the plurality of tilted flat mirrors is placed in proximity to a corresponding optical focusing element of the plurality of optical focusing elements; and
   wherein the plurality of linear fiber trenches, the plurality of tilted flat mirrors, and the plurality of optical focusing elements are fabricated on different substrates for achieving high signal efficiency and relaxed alignment tolerances.

2. The optical connector of claim 1, wherein each of the plurality of optical fibers is disposed in a respective one of the linear fiber trenches.

3. The optical connector of claim 2, wherein each of the optical focusing elements is placed at a predefined lateral distance from a corresponding optical fiber.

4. The optical connector of claim 1, wherein each of the plurality of linear fiber trenches is shaped at least as a V-groove.

5. The optical connector of claim 1, wherein each of the plurality of linear fiber trenches is shaped as any one of: a square, a cylinder, and a diamond.

6. The optical connector of claim 1, wherein each of the plurality of tilted flat mirrors is tilted at a predefined angle.

7. The optical connector of claim 1, wherein each of the plurality of the optical focusing elements is at least a curved mirror.

8. The optical connector of claim 1, wherein each of the plurality of the optical focusing elements is designed to convert a parallel light beam to a focused light beam directed to a drain at the PIC.

9. The optical connector of claim 1, wherein at least one of the plurality of optical fibers includes a laser.

10. The optical connector of claim 1, wherein each of the tilted flat mirrors is utilized to direct a light beam from a respective one of the optical fibers disposed in a corresponding respective one of the linear fiber trenches.

11. The optical connector of claim 1, wherein at least one of the optical fibers is a light drain.

* * * * *